(No Model.)
G. W. AMESBURY.
ADJUSTABLE CUTTER HEAD.
No. 260,817.
Patented July 11, 1882.
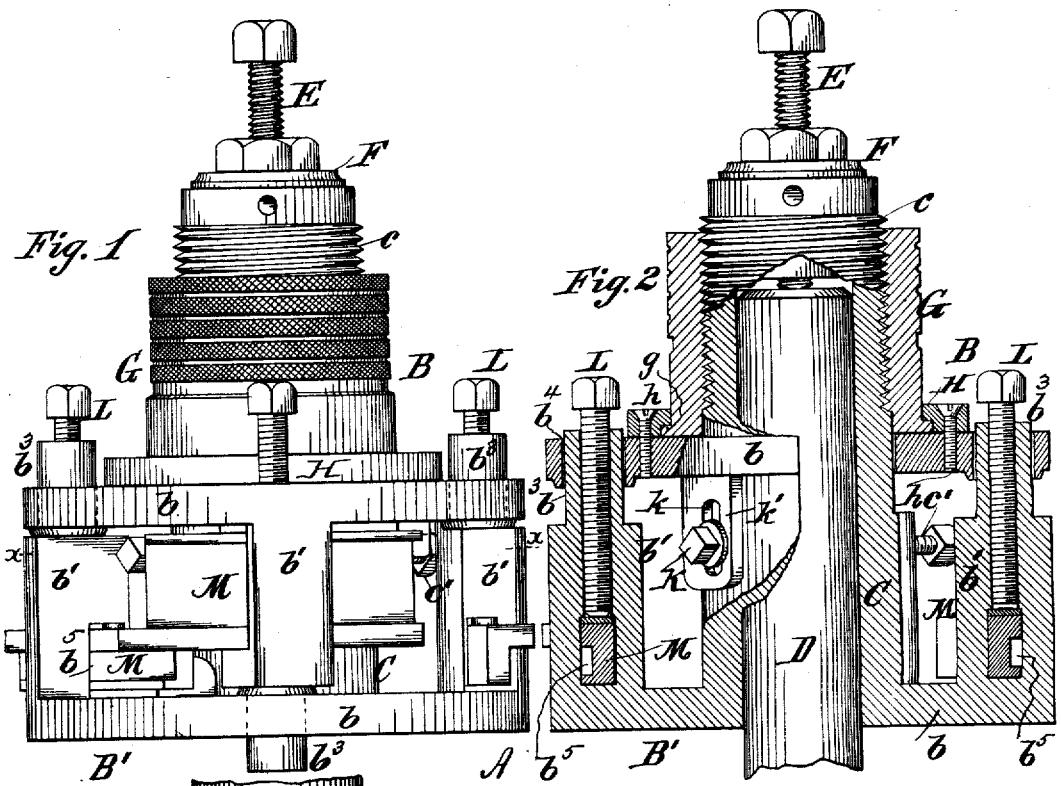
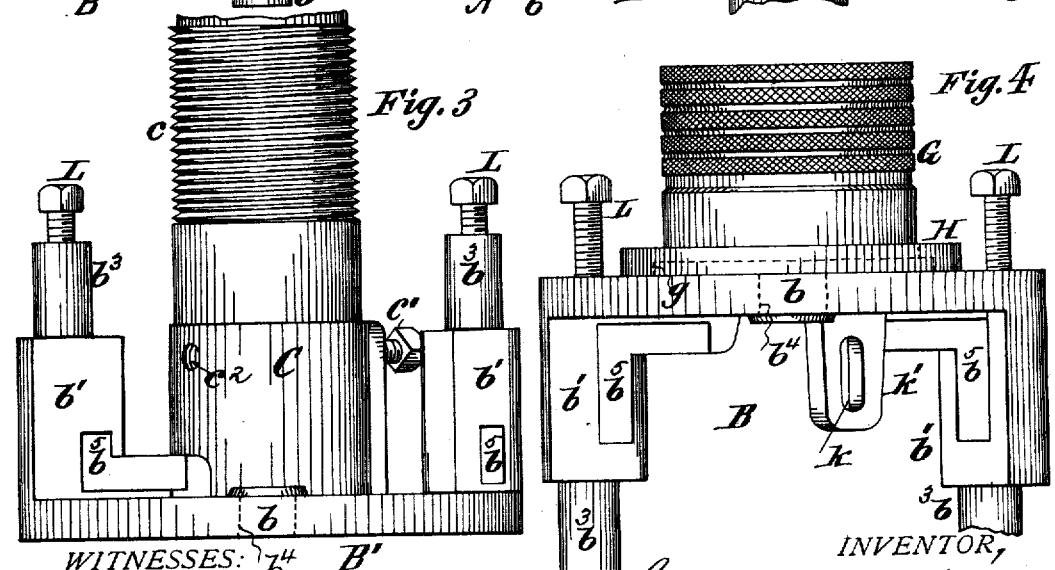
WITNESSES:
Edwin Paramore
M. H. Coonzauger
INVENTOR,
George W. Amesbury
By S. F. VanStavoren
ATTORNEY

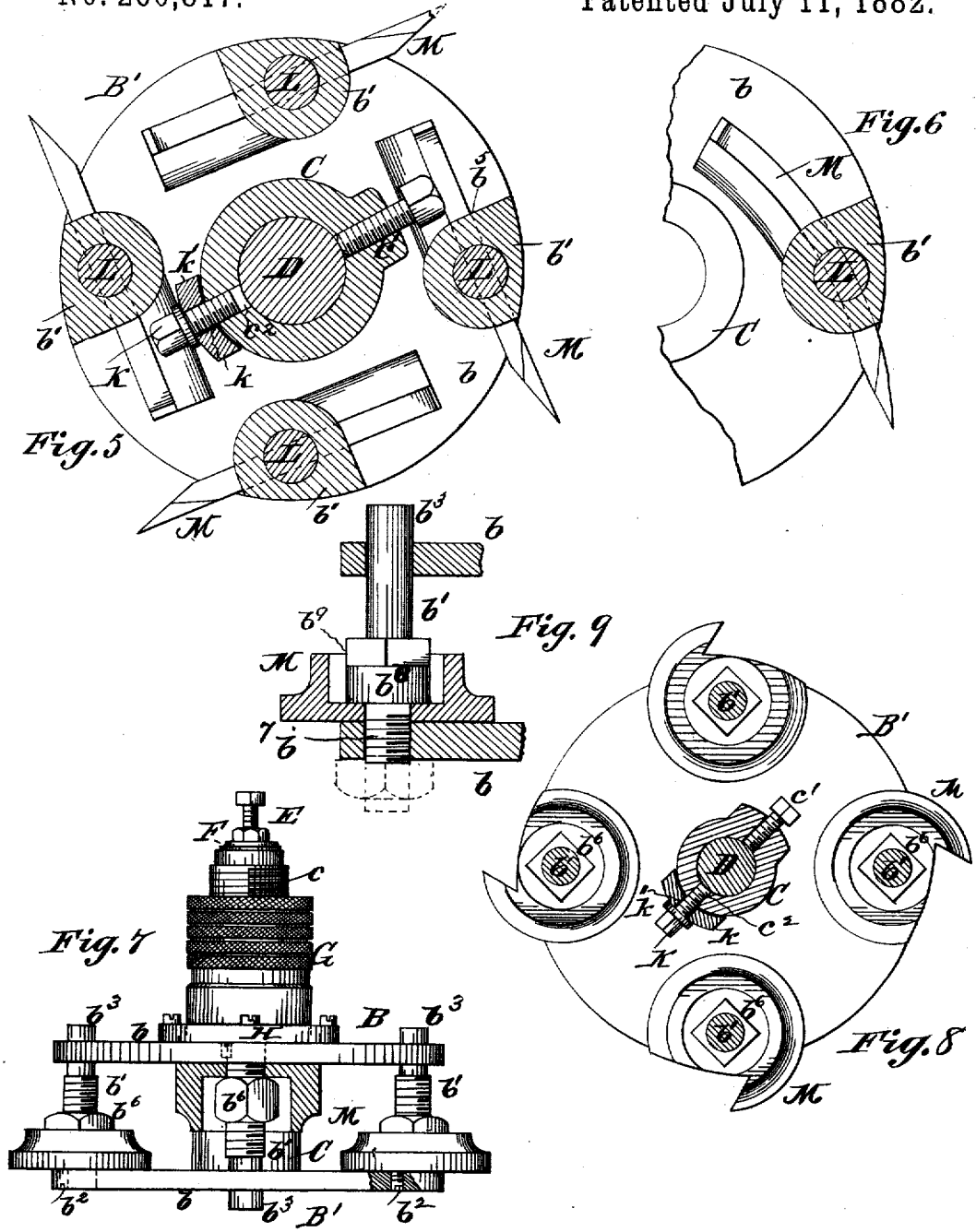

UNITED STATES PATENT OFFICE.

GEORGE W. AMESBURY, OF PHILADELPHIA, PENNSYLVANIA.

ADJUSTABLE CUTTER-HEAD.

SPECIFICATION forming part of Letters Patent No. 260,817, dated July 11, 1882.

Application filed March 21, 1882. (No model.)

*To all whom it may concern:*

Be it known that I, GEORGE W. AMESBURY, a citizen of the United States, and a resident of the city and county of Philadelphia, in the State of Pennsylvania, have invented certain new and useful Improvements in Adjustable Cutter-Heads for Wood-Working, of which the following is a specification, reference being had to the accompanying drawings, wherein—

Figure 1 is an elevation of a cutter-head embodying my improvements. Fig. 2 is a transverse vertical section of the same, partly in elevation. Figs. 3 and 4 are elevations of the two members composing the cutter-head. Fig. 5 is a horizontal section on line $x\,x$, Fig. 1. Fig. 6 is a broken detail plan. Fig. 7 is an elevation, partly sectional, of a modified form of my invention adapted for circular bits. Fig. 8 is a sectional plan of the same, and Fig. 9 is a broken section of a modification.

My invention has relation to an improvement on Letters Patent of the United States granted to me February 22, 1881, No. 238,074, for cutter-head for molding and matching lumber, and has for its object to simplify the construction of such cutter-head, so as to obtain a rapid and easy mode of adjustment for the cutters, and so arrange or dispose the parts forming the cutter-head that the cutters may have a greater or less pitch given to them, as desired, such parts being so formed that straight, segmental, or circular bits or cutters may be applied to the cutter-head.

My invention accordingly consists in forming the cutter-head in two parts or members, each of which is composed of a flange or disk provided with two or more segments, posts, or cutter-holding devices, which are each separate from and unconnected with one another.

The posts of each member of the cutter-head are arranged to have their free ends pass through openings in the flange of the opposite member, so as to connect or lock said members together. One of such members is provided with a hub exteriorly threaded, upon which screws a nut swiveled to the remaining member, whereby when said swiveled nut is turned said members are caused to recede from or approach to each other to vary the adjustment of the cutters.

When the desired adjustment is secured both members are retained in position in relation to each other, and maintain such adjustment by means of a set-screw which passes through a slot in a depending lug of one member and into the hub of the other member of the cutter-head. The latter is secured to the driving-shaft by a set-screw on the opposite side of the hub.

Referring to the accompanying drawings, A represents my improved cutter-head, composed of two members, B and B', the former being designed and adapted to be the movable and the latter the fixed member of the cutter-head; but such arrangement may, if desired, be reversed without departing from the principle of my invention. Each such member is composed of a flange or disk, $b$, carrying or provided with two or more posts, segments, or cutter or bit holders, $b'\,b'$. Said posts are separate from and independent of each other, and they may be formed integrally with the flanges $b$, or secured thereto by means of screws $b^2$, as shown in Fig. 7; or they may be arranged thereon in any other suitable or desired manner, and may be of any desired configuration in cross-section, such form being regulated by the character or shape of the bit or cutter designed to be used. Various forms of cutters and posts are illustrated in the drawings.

The free ends $b^3$ of the posts are turned or otherwise finished so as to pass into and fit snugly in openings $b^4\,b^4$ in the flanges of the members B B', so as to have liberty of movement in said openings—that is to say, the finished ends of the posts of one member pass into openings in the flange of the opposite member, and thereby connect or lock such members together to form the cutter-head. The member B' is formed with a central hub, C, into which passes the shaft or spindle D; and E represents an adjusting-screw fitting in the plug F, inserted in the upper end of said hub, so as to adjust the cutter-head on said shaft.

The hub C is threaded exteriorly, as shown at $c$, and is provided with a set-screw, $c'$, by means of which the cutter-head is securely fastened to shaft D.

G is a nut screwing upon the threaded hub C, and is swiveled to flange $b$ of member B by means of the annular rim $g$ and rabbeted ring H, screwed at $h$ $h$ to said flange $b$, the effect whereof is that as said nut is turned the member B is caused to slide up or down to recede from or approach the member B'. As said member B so moves, its attached posts $b'$ $b'$ partake of such movement and carry therewith their contained cutters, and thereby alter or vary the adjustment of said cutters in relation to those contained in the posts of the member B'. When such adjustment is effected it is duly maintained by tightening set-screw K, which passes through an elongated slot, $k$, in a lug, $k'$, depending from flange $b'$ of member B, and into a threaded opening, $c^2$, in hub C, as more plainly shown in Fig. 5.

The bits or cutters, when straight or segmental, pass through openings $b^5$ in posts $b$, and are retained therein by means of set-screws L. Such cutters are represented at M M, and they may be straight, as shown in Figs. 1, 2, and 5, segmental, as indicated in Fig. 6, or circular, as illustrated in Figs. 7 and 8. In the latter case the cutters are held in a rigid position upon the circular posts by jam-nuts $b^6$, which screw upon said posts, as shown. The openings $b^5$ in said posts may be formed therein at any desired angle of inclination, vertically or laterally, in order to obtain any desired pitch for the cutters.

It is evident that the foregoing-described cutter-head is so constructed that its cutters may be easily and rapidly adjusted, for to effect such result all that is necessary is to loosen set-screw K, then turn nut G either to the right or to the left until the desired adjustment is secured, whereupon the screw K is tightened up, and the parts of the cutter-head are thereby rigidly locked or held together to preserve such adjustment of the cutters.

The posts $b'$ may, if desired, be in the form of long bolts, as shown in Fig. 9, and provided with a shoulder or collar, $b^8$, squared, as shown at $b^9$, for the application of a wrench thereto. Said bolt or post is threaded, as shown at $b^7$, and screws into the flange $b$ of the lower member of the cutter-head, the opposite or unthreaded end, $b^3$, of said bolt passing through opening in flange $b$ of remaining member of the cutter-head; or a nut may be applied to the lower end of said bolt for fastening purposes, as indicated by dotted lines in said figure.

What I claim as my invention is—

1. An adjustable cutter-head for wood-working, composed of two flanges or disks carrying independent and disconnected posts or cutter-holders and set or retaining screws for such cutters, the posts on each flange passing into openings in the opposite flange, so as to lock or connect said parts together, substantially as shown and described.

2. An adjustable cutter-head for wood-working, composed of two flanges or disks carrying posts or cutter-holders, the free ends of the holders of one disk entering openings in the opposite disk, and means for adjusting said disks to and from each other, substantially as shown and described.

3. An adjustable cutter-head for wood-working, composed of two disks with posts or bolts secured thereto, the free ends of such posts entering openings in said disks, and means for securing the parts in position, substantially as described.

4. An adjustable cutter-head composed of two members carrying interlocking cutter-holders, one of said members having a depending slotted lug through which passes a set-screw which engages with a hub formed on the opposite member to hold said parts rigidly together when adjusted, substantially as shown and described.

In testimony that I claim the foregoing I have hereunto set my hand this 15th day of March, 1882.

GEORGE W. AMESBURY.

Witnesses:
CHAS. F. VAN HORN,
S. J. VAN STAVOREN.